Oct. 16, 1962

E. E. HOWE 3,058,762

SCREW THIMBLE FITTING HAVING TOGGLE
RINGS WITH A SEALING FEATURE

Filed Nov. 17, 1958

INVENTOR.
Earl E. Howe.
BY E. J. Bailiff
ATTORNEY.

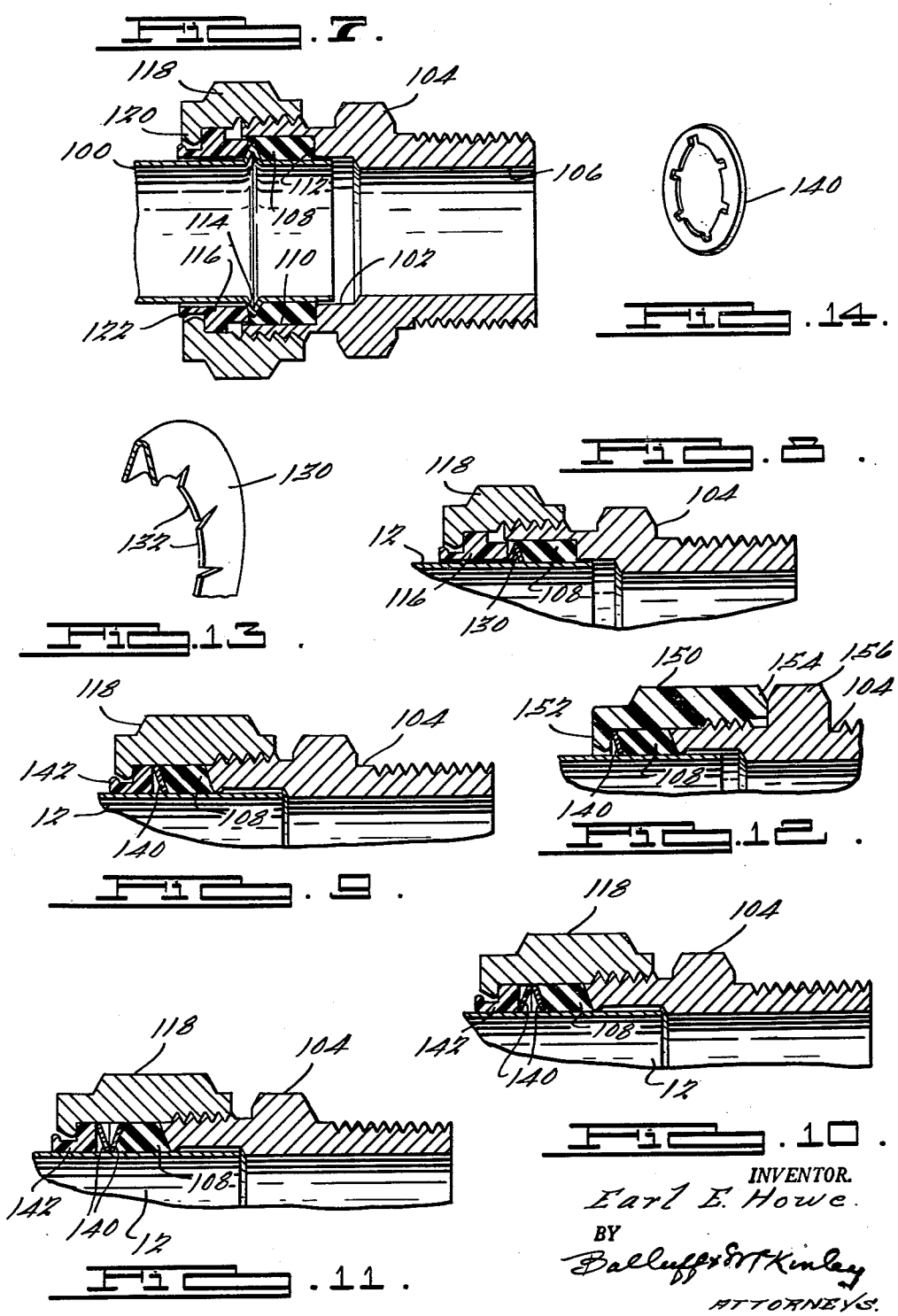

3,058,762
Patented Oct. 16, 1962

3,058,762
SCREW THIMBLE FITTING HAVING TOGGLE RINGS WITH A SEALING FEATURE
Earl E. Howe, Chicago, Ill.
Filed Nov. 17, 1958, Ser. No. 774,558
3 Claims. (Cl. 285—340)

This invention relates to tube fittings and has particular reference to a new and improved seal construction for a tube joint and a means for locking the tube relative to the fitting to which it is connected. The present tube fitting is particularly suited for use in high pressure fluid intallations.

A principal object of the invention is to provide a new and improved tube fitting.

Another object of the invention is to provide a tube fitting constructed so as to automatically lock the tube relative to the fitting upon assembly of the fitting.

A further object of the invention is to provide a tube joint adapted for use in high pressure fluid installations.

Other and further objects of the invention will be apparent from the following description and claims and may be understood by reference to the accompanying drawings, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

FIGS. 7, 8, 9, 10, 11 and 12 illustrate further modified forms of the invention;

FIG. 13 is a fragmentary perspective view of the locking element employed in the modification shown in FIG. 8; and FIG. 14 is a perspective view of one of the lock washers employed in the embodiments of the invention illustrated in FIGS. 9, 10, 11 and 12.

Figure 1:
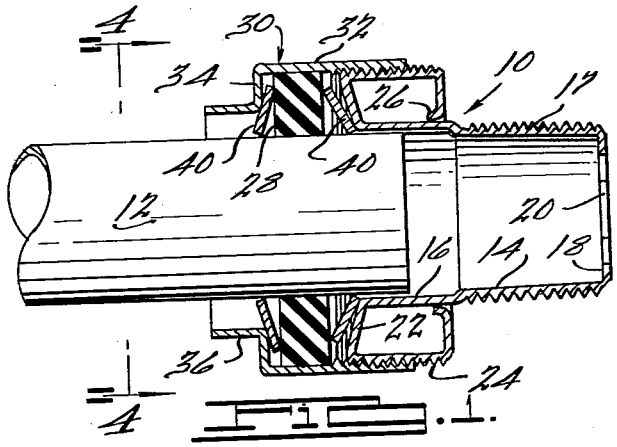
FIG. 1 is a sectional view of one form of the invention and showing the fitting in partially assembled condition.
Figure 2:
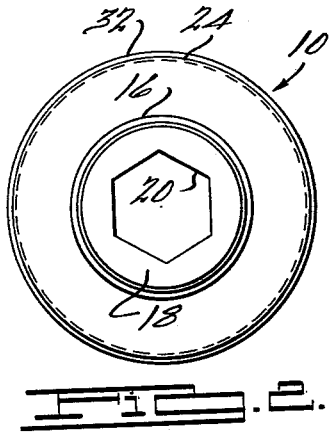
FIG. 2 is an end elevational view of the fitting shown in FIG. 1.

Referring more particularly to the drawings, the fitting comprises a socket element 10 to which a tube 12 is to be assembled in fluid-flow relation. The socket element 10 may consist of a sheet metal part as shown in FIGS. 1 to 4 and includes a tubular portion 14 defining a bore 16 into which one end of the tube 12 projects in spaced relation. The tubular portion 14 is provided with exterior threads 17 for securing the socket element to a wall or other fixed support. The end wall 18 of the socket element is provided with a hexagonal opening 20 to provide a means for threading the socket element into the part to which it is to be connected.

The socket member 10 is flared outwardly at its other end to define a radially extending end wall 22 and then is bent back upon itself to provide a cylindrical outer wall 24 provided with threads as shown. The outer wall 24 is then bent inwardly toward the tubular portion 14 and is provided with an axially directed flange 26 seated against the exterior surface of the tubular portion 14.

Figure 3:
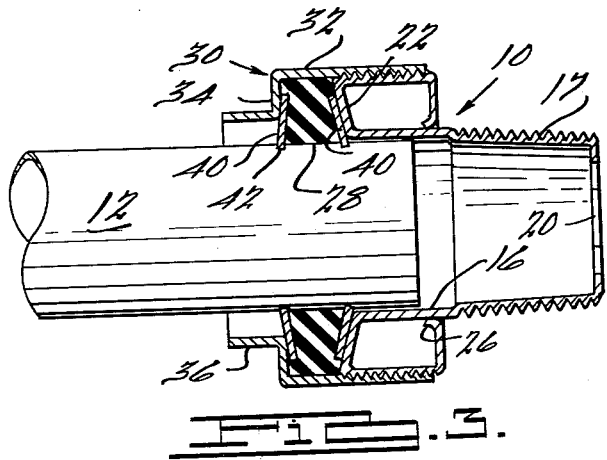
FIG. 3 is a view similar to FIG. 1 showing the fitting in final assembled relation.
Figure 4:
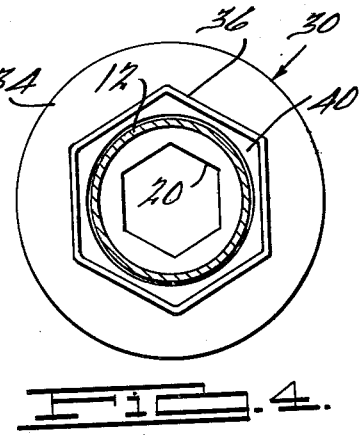
FIG. 4 is a sectional view taken on line 4—4 of FIG. 1.

An annular seal 28 surrounds the tube 12 and the seal 28 may be made of rubber or of any other suitable resilient, elastomeric material having sealing properties. The seal 28 is a continuous ring generally rectangular in cross-section. A compression element in the form of a nut 30 surrounds the seal 28 and may also be made of a sheet metal stamping. The nut 30 includes an outer cylindrical wall 32 provided with threads for threaded engagement with the wall 24 of the socket element 10. The nut has a radially extending end wall 34 in opposed relation to the end wall 22 on the socket element. The end wall terminates in an axially directed tubular portion 36 through which the tube projects in spaced relation. The tubular portion 36 may be hexagonal in shape so as to receive a wrench for tightening the nut 30 onto the socket element 10. A lock washer 40 surrounds the tube on either side of seal 28. The lock washers 40 are generally conical and may be made of resilient metal such as spring stock. The apertures 42 in the washers are of slightly less diameter than the diameter of the tube 12, and FIG. 1 illustrates the condition of the washers 40 upon assembly onto the tube 12 but prior to final tightening of the nut 30 onto the socket element 10. The cylindrical wall 32 of the nut and the end walls 34 and 22 on the nut and socket element respectively form a compression chamber within which the seal and washers 40 are located so as to be subject to compression upon tightening of the nut onto the socket element. The end walls 34 and 22 engage the washers 40 when the nut is tightened to compress the washers against the seal 28. The washer 40 is provided at spaced intervals with crimped or cut-out portions 44. It will be apparent that the metal forming the crimped portions 44 could be removed if desired to form slits or cut-outs at spaced intervals around the inner periphery of the washers. The purpose of the cut-outs 44 is to enable the washers to be flattened upon compression of the nut 30 so that the inner edge of the washers will bite into the exterior surface of the tube 12 to lock the tube relative to the fitting. The fitting is shown in FIG. 3 in its final assembled relation in which the nut 30 has been tightened onto socket member 10 so as to compress the washers 40 against the seal 28 and to compress the seal in an axial direction so that the material of the seal will flow radially into sealing engagement with the exterior of the tube 12 and into sealing engagement with the opposed inner surface of the wall 32 of the nut 30. The washers 40 are flattened from their original conical shape so as to bite into the tube and firmly lock the tube relative to the fitting. It will be noted that as the nut is tightened onto the socket member, the end wall 34 of the nut engages the adjacent washer 40 rather than the seal 28 so as to prevent twisting or distortion of the seal due to the turning of the nut. In the present fitting there is no direct metal-to-metal engagement between the tube and the socket element 10 and the nut 30 so that vibrations and tube stresses resulting therefrom are greatly reduced or eliminated with a consequent reduction in tube failure. The use of stamped sheet metal parts for the socket element 10 and the nut 30 provides a substantial reduction in cost and weight of the fitting while permitting use of such parts in relatively high-pressure installations.

While I have illustrated a pair of washers 40 in the preferred form of the invention, it will be apparent that one of such washers could be eliminated if desired, since one of such washers will provide the locking function and prevent distortion or twisting of the seal upon tightening of the nut 30.

Figure 6:
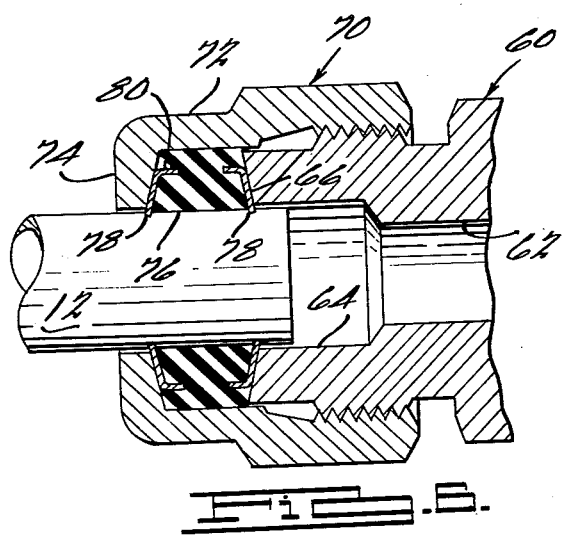
FIG. 6 is a sectional view showing a modified form of the invention.
Figure 5:
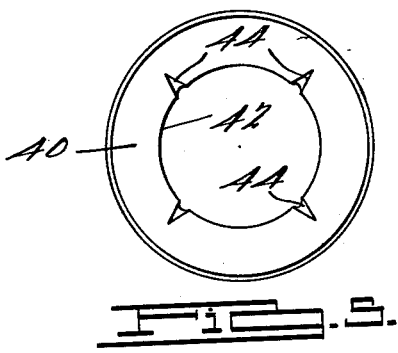
FIG. 5 is an elevational view of one of the washers employed in the fitting.

A modified form of the invention is shown in FIG. 6 in which the socket element 60 and the nut 70 are cast metal parts rather than being made from sheet metal as in the previous modification. The socket element 60 is adapted for connection to a suitable support and has a central passage 62 having an enlarged bore 64 at its outer end adapted to receive one end of the tube 12. The socket element 60 has a radially extending end wall 66 and is externally threaded for connection with the nut 70. The nut 70 includes a cylindrical wall portion 72 spaced from the tube 12 and is provided with an end wall 74 having an aperture through which the tube projects. The opposed walls 66 and 74 on the socket and nut respectively form a compression chamber within which the seal 76 is located. In this form of the invention the washers 78 are generally conical as illustrated and have axially directed peripheral flanges 80. The seal 76 may be molded around the washers 78 or the flanges 80 may be imbedded in the material of the seal. When the nut 70 is tightened onto the socket 60, the seal 76 will be compressed into sealing engagement with the exterior surface of the tube and with the wall 72 of the nut to provide a fluid-tight joint. As in the previously described form of the invention the washers 78 will be flattened slightly so that the inner edges thereof will bite into the tube to firmly lock the tube to the fitting. Additionally, as in the previously described form of the invention, the end wall 74 of the nut bears against one of the washers 78 when the nut is tightened onto the socket so that the seal material is not subjected to the abrasive action of the end wall 74 and is not twisted or distorted by such engagement. It will be apparent that a single washer 78 might be employed rather than the two washers illustrated.

The resilient seal member not only reduces vibrations and absorbs stresses which would otherwise be imparted to the tube but also permits slight misalignment of the tube and permits some degree of angular movement of the tube relative to the fitting.

In the form of the invention shown in FIG. 7, the tube 100 is received within a counterbore 102 formed within a socket element 104 having a fluid-flow passage 106 therein. A resilient seal ring 108 surrounds the end of the tube 100 and is disposed within an enlarged counterbore 110 formed in the socket element 104. The seal 108 is confined between a radially extending shoulder 112 defining the inner end of the counterbore 110 and an annular bead or flange 114 formed integrally with the tube 100. A compression member 116 in the form of an annular ring of nylon or other suitable plastic material surrounds the tube 100 inwardly along the tube from the seal 108 and the locking flange 114. A nut 118 is threaded onto the socket element 104 and has a radial wall 120 engaging the compression member 116 to tighten the latter against the locking element 114 on the tube and thereby to compress the seal 108 between the socket element 104 and the flange 114. The compression member 116 may be provided with an annular bead or a series of radial projections 122 by means of which the plastic ring may be snapped into place in the aperture in the radial wall 120 of the nut 118. As the nut 118 is tightened onto the socket element 104, the thrust thereof is taken by the compression member 116 so that there is no angular distortion of the seal 108.

In the modification shown in FIG. 8, the construction is the same, except that the locking member is provided by an annular metallic ring 130 disposed between the seal 108 and the compression member 116. The locking member 130 is V-shaped in cross-section, as shown in FIGS. 8 and 13, and is provided with a series of serrations on its inner periphery defining teeth 132 adapted to bite into the metal of the tube 12 as the nut 118 is tightened onto the socket element 104.

In the embodiment of the invention shown in FIG. 9, the locking member comprises a conical washer 140 of the kind illustrated in FIG. 14. In this modification the compression member 142 engages the outer periphery of the washer 140 to flatten the same upon tightening of the nut 118 onto the socket element 104, thereby causing the inner periphery of the washer 140 to bite into the tube 12.

In the form of the invention shown in FIG. 10, two of the lock washers 140 are employed and are arranged with their outer peripheries in engagement and their inner peripheries separated, as shown, so that upon tightening of the nut 118 onto the socket element 104, the washers 140 will be slightly flattened to cause them to bite into the tube 12 to lock the tube within the socket element.

The modification of the invention shown in FIG. 11 is the same as that shown in FIG. 10, except that the two washers 140 are oppositely arranged so that their inner peripheries are in engagement while their outer peripheries are spaced prior to final tightening of the nut 118 onto the socket 104.

In the form of the invention shown in FIG. 12, the compression member and the nut are integrally formed as a nylon or plastic member 150 having threaded engagement with the socket element 104 and provided with an end wall 152 engaging one of the washers 140 in the manner previously described. In this modification the plastic element 150 engages the lock washer 140 to prevent distortion of the seal 108 and also effects compression of the seal in the manner previously described. This modification differs from those previously described in that the end 154 of the compression member 150 is adapted to engage the shoulder 156 on the socket element 104 to effect a predetermined compression of the seal 108. This arrangement will prevent the seal from being too highly compressed but will provide an effective sealed tube joint.

This application is a continuation-in-part of my co-pending application Serial No. 551,089 filed December 5, 1955, now abandoned, for "Tube Fitting."

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A tube fitting comprising a threaded socket element adapted to receive one end of a metal tube having a cylindrical surface of uniform diameter, an annular seal of resilient material surrounding said tube, compression means surrounding said tube and having a substantially axially extending portion adapted to engage said threaded socket, said socket element and said compression means having opposed substantially radially extending walls defining with said substantially axially extending portion and with said tube a chamber, said seal being disposed in said chamber and adapted for sealing engagement with said tube and with said walls and said portion forming said chamber, at least one locking element comprising a conical metal ring on said tube between said seal and said compression means, said conical metal ring being of a maximum radial extent less than the distance from said tube to said axially extending portion, said compression means including means for tightening said compression means against said locking element thereby to force the latter against said real to compress said seal and effect said sealing engagement against said substantially radially extending wall of said compression means above the outermost radial portion of said locking element and to flatten said ring to cause the same to bite into said tube to lock said tube within said socket element, said seal also having a radial surface engaging said radial wall on said socket element, whereby a seal is provided between said tube and said socket element and said tube is retained within said socket element.

2. A tube fitting according to claim 1 wherein said socket element is provided with a shoulder thereon forming a stop engaged by said compression means to provide a predetermined degree of compression of said seal.

3. A tube fitting according to claim 1 wherein said compression means includes a noncompressible plastic ring disposed in said chamber adjacent said locking element, said means for tightening including threads on said substantially axially extending portion matingly engaging said threaded socket.

(References on following page)

References Cited in the file of this patent

UNITED STATES PATENTS

| | | |
|---|---|---|
| 2,201,372 | Miller | May 21, 1940 |
| 2,226,039 | Wiltse | Dec. 24, 1940 |
| 2,409,283 | Hudson | Oct. 15, 1946 |
| 2,448,888 | Hynes | Sept. 7, 1948 |
| 2,459,608 | Wolfram | Jan. 18, 1949 |
| 2,474,880 | Woodling | July 5, 1949 |
| 2,479,447 | Wiltse | Aug. 16, 1949 |
| 2,484,192 | Squiller | Oct. 11, 1949 |
| 2,784,933 | Newell et al. | Mar. 12, 1957 |